US007808217B2

(12) United States Patent
de Cremoux et al.

(10) Patent No.: US 7,808,217 B2
(45) Date of Patent: Oct. 5, 2010

(54) DC TO DC CONVERTER (75) Inventors: Guillaume de Cremoux, Edinburgh (GB); Innes J. A. Gray, Glasgow (GB)

(73) Assignee: Analog Devices, Inc., Norwood, MA (US)

( * ) Notice: Subject to any disclaimer, the term of this patent is extended or adjusted under 35 U.S.C. 154(b) by 368 days.

(21) Appl. No.: 11/975,305

(22) Filed: Oct. 18, 2007

(65) Prior Publication Data
US 2009/0102441 A1 Apr. 23, 2009

(51) Int. Cl.
G05F 1/10 (2006.01)
G05F 1/613 (2006.01)

(52) U.S. Cl. .................... 323/222; 323/225

(58) Field of Classification Search ........... 323/222, 323/223, 225, 268, 271, 282, 285, 288
See application file for complete search history.

(56) References Cited

U.S. PATENT DOCUMENTS

| 5,734,258 | A | * | 3/1998 | Esser ................... 323/224 |
|---|---|---|---|---|
| 5,831,418 | A | | 11/1998 | Kitagawa |
| 6,037,755 | A | | 3/2000 | Mao et al. |
| 6,087,816 | A | * | 7/2000 | Volk .................... 323/282 |
| 6,166,527 | A | | 12/2000 | Dwelley et al. |
| 6,215,286 | B1 | * | 4/2001 | Scoones et al. ........... 323/222 |
| 6,788,033 | B2 | * | 9/2004 | Vinciarelli ............... 323/225 |
| 6,812,676 | B2 | | 11/2004 | Tateishi |
| 6,984,967 | B2 | | 1/2006 | Notman |
| 7,157,888 | B2 | | 1/2007 | Chen et al. |
| 7,176,667 | B2 | | 2/2007 | Chen et al |
| 7,256,570 | B2 | | 8/2007 | Zhou et al. |
| 7,265,524 | B2 | | 9/2007 | Jordan et al. |
| 7,298,119 | B1 | | 11/2007 | Amram Summit et al. |
| 7,646,179 | B2 | * | 1/2010 | Hagino .................... 323/222 |
| 2006/0176038 | A1 | | 8/2006 | Flatness et al. |

* cited by examiner

Primary Examiner—Matthew V Nguyen
(74) Attorney, Agent, or Firm—Kenyon & Kenyon LLP (57) ABSTRACT A DC to DC converter comprising: an inductor; a plurality of switches for controlling current flow in the inductor such that the inductor is connected to a supply in a first phase of operation such that the inductor receives energy from the supply, and such that the inductor is connected to an output in a second phase of operation in order to deliver energy to the output; and a controller arranged to monitor the current flow in the inductor at the end of the second phase of operation and to modify the relative duration of the second phase compared to the first phase as a function of the current flow.

32 Claims, 6 Drawing Sheets

DC TO DC CONVERTER

FIELD OF THE INVENTION

The present invention relates to a DC to DC converter.

BACKGROUND OF THE INVENTION

It is well known that DC to DC converters can be made to step down, that is BUCK, or step up, that is BOOST, a DC input voltage to a DC output voltage. The DC to DC converter may comprise an inductor in association with two or more transistors such that the current in the inductor can be built up such that energy is stored in it by virtue of its magnetic field, and then that energy can be discharged from the inductor in order to charge a storage capacitor at the output of the DC to DC converter. Each time the transistors are switched some energy is lost, either through ohmic heating of the transistor as it transitions from a low impedance state to a high impedance state, or to currents lost to the control electrode, such as the base of a bipolar transistor or the gate of a field effect transistor as the transistor is switched on and off. These losses are insignificant when the load served by the DC to DC converter is drawing significant portions of an amp. However, where the load draws very little current, for example because it is a mobile telephone receiver designed with a long battery life in mind, then the losses due to switching the transistors on and off become more significant.

It should be noted that such inductor based DC to DC converters inherently require a ripple current to occur in the inductor otherwise the converter loses its ability to regulate its output voltage in response to changes of load current.

SUMMARY OF THE INVENTION

According to a first aspect of the present invention there is provided a DC to DC converter comprising: an inductor; a plurality of switches for controlling current flow in the inductor such that the inductor is connected to a supply in a first phase of operation such that the inductor receives energy from the supply, and such that the inductor is connected to an output in a second phase of operation in order to deliver energy to the output; and a controller arranged to monitor the current flow in the inductor at the end of the second phase of operation and to modify the relative duration of the second phase compared to the first phase as a function of the current flow.

It is thus possible to provide a DC to DC converter with a relatively simple control strategy that can adjust its charge and discharge times of the inductor under closed loop control.

Advantageously the current is built (increases) in the inductor during an energising or magnetising phase until such time as the current reaches a predetermined peak current value. The switches associated with the inductor are then operated so as to discharge the inductor thereby reducing the current therein to the target value. Preferably the target value is zero current.

Given that the inductor has a fixed value, although this may vary due to manufacturing tolerances, then a control strategy can be implemented in which the time in which the inductor is magnetised is inversely proportional to the input voltage to the DC to DC converter. Therefore, at the end of the charging period, the current in the inductor should have built to around a peak value. Similarly, the time for which the inductor is discharged or demagnetised should be inversely proportional to the output voltage.

Advantageously the DC to DC converter is also operable in a further mode, wherein the transistors which form the switches associated with the inductor are placed in a high impedance state such that the output of the converter is isolated from the input of the DC to DC converter and that any current drawn by a load is drawn solely from the charge store.

Advantageously, the voltage across the charge store can be monitored such that DC to DC voltage conversion mode is disabled and the further mode enabled once the voltage on the charge store exceeds an upper voltage threshold, and the further mode is exited, and optionally the DC to DC conversion mode or some other charging mode entered once the voltage on the charge store drops below a low voltage threshold.

Preferably the switches are placed in a high impedance state just as the current flow through the inductor is measured. Current flow paths are provided, preferably by unidirectional current flow devices in parallel with the switches, such that the direction of current flow can be determined merely by measuring the voltage at one terminal of the inductor.

Advantageously the parallel unidirectional current flow devices associated with each of the switches are diodes and the switches are transistors. A particular advantage of the present invention is that the diodes are advantageously the parasitic diodes that are inherently formed during the fabrication of transistors on an integrated circuit. These diodes function like fly-back diodes in order to allow current to continue to flow immediately after the transistors have been switched into a high impedance state. When a diode is conducting the voltage across it drops to approximately 0.6 to 0.7 volts, and consequently current flow from or to the inductor can be inferred by measuring the voltage drop across the unidirectional devices connected between the first node and the common node and between the second node and the common node.

The inventor has noted that it is sufficient to merely have an indication of the direction of current flow at the time instant immediately following the end of the discharge cycle of the inductor, without having to have knowledge of the magnitude of the current flow.

According to a second aspect of the present invention there is provided a DC to DC converter, comprising: first, second, third and fourth electrically controlled switches, each in parallel with a unidirectional current flow device; an inductor; and input; an output and a controller, the first switch extending between the input and a first node, the inductor extending between the first node and a second node, the second switch extends between the second node and a common node, the third switch extends between the common node and the first node, and the fourth switch extends between the second node and the output, and a charge store extends between the output, and a common node, wherein the controller is adapted to control the switches in a first mode of operation so as to build the current in the inductor and then to reduce the current, thereby delivering charge to the charge store, and wherein the controller monitors the current flow after a reducing period, and varies one of the time for which the current is built in the inductor and the time for which the current is reduced so as to set the current flow to a target value.

In a preferred embodiment the time for which the current is reduced is varied.

According to a third aspect of the present invention there is provided a method of operating a DC to DC converter where the converter comprises an inductor and a plurality of switches for controlling current flow in the inductor such that the inductor is cyclically magnetised and demagnetised, the method comprising the steps of estimating the direction of current flow at the end of the demagnetisation step, and adjusting the duration of the next demagnetisation step based on the direction current flow.

BRIEF DESCRIPTION OF THE DRAWINGS

The present invention will further be described, by way of example, with reference to the accompanying drawings, in which.

DESCRIPTION OF PREFERRED EMBODIMENTS OF THE INVENTION

Figure 1:
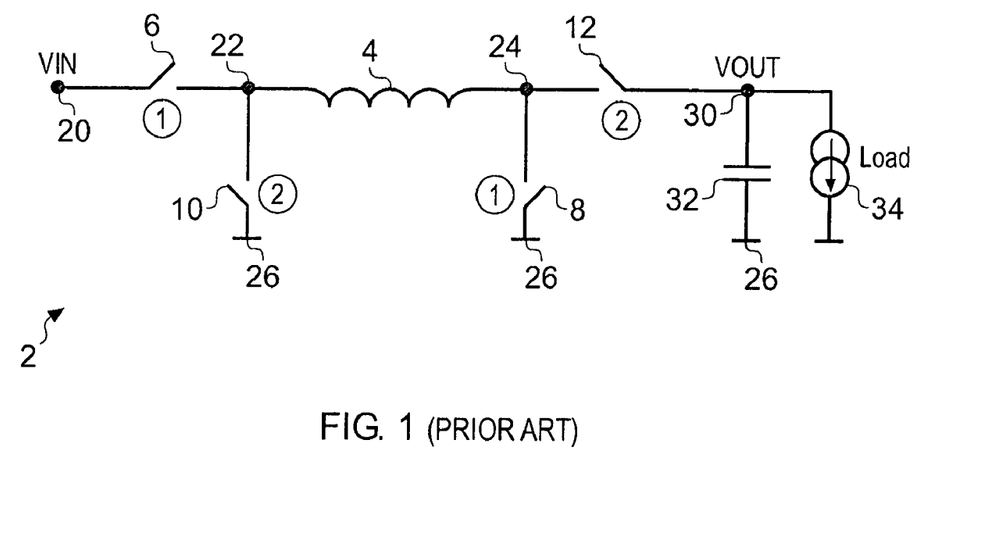
FIG. 1 schematically illustrates a DC to DC converter.

FIG. 1 shows, in simplified form, a well known configuration of a BUCK-BOOST converter 2. The converter 2 comprises an inductor 4 in combination with first to fourth electrically controlled switches 6, 8, 10 and 12. As shown, the first switch 6 is connected between an input node 20 and a first node 22. The inductor is connected between the first node 22 and a second node 24. The second switch is connected between the second node 24 and a common node 26, which typically is a local ground, which in the case of a battery powered device is one of the battery terminals. The third switch 10 extends between the common node 26 and the first node 22. The fourth switch is connected between the second node 24 and an output node 30. An energy storage device, such as a capacitor 32, is connected between the output node 30 and the common node 26 so as to store charge for delivery to a load 34, and also to smooth the voltage at the output node 30.

The operation of switching converters is well known, but for simplicity it can be regarded as selectively building current in the inductor by placing the first and second switches 6 and 8 into a conducting state while the third and fourth are placed into a non-conducting state. Once the current in the inductor has built to a desired value the first and second switches are made non-conducting and the third and fourth switches are made conducting.

The magnetic field around the inductor collapses and the energy therein is transferred to the energy storage capacitor 32.

The voltage converter has to work over a wide input voltage range. As a result the circuit is specified to work for the worst case condition, i.e. lowest permissible input voltage and highest permissible output current. Typically the charging current to the inductor is chosen such that peak current is several hundred milliamps.

The switches are implemented as transistors and each time transistor is switched from non-conducting to conducting it spends a proportion of that time in a regime where the resistance of the transistor is significant enough to give rise to device heating and hence power dissipation—which can be regarded as degrading the conversion efficiency of the DC to DC voltage converter. Energy is also lost charging and discharging parasitic components associated with the control terminal of the transistor. The switching losses are minimal when the converter is supplying a large output current. However, as the output current decreases the switching losses remain substantially unchanged so the proportion of energy lost in the conversion increases.

It is known to modify the operation of the DC to DC converter to "skip" conversion cycles when the converter is only lightly loaded.

Figure 2A:
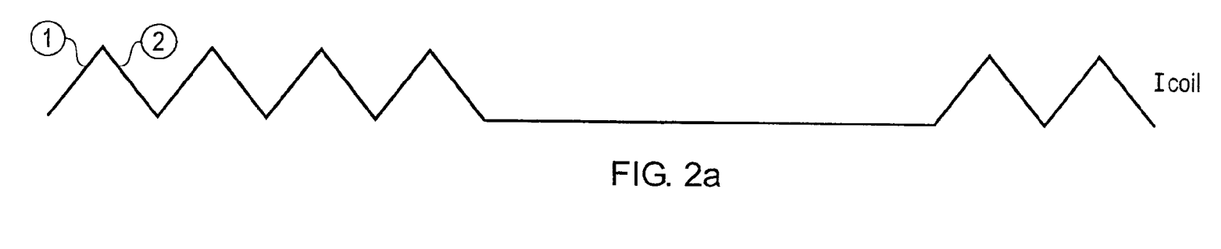
FIG. 2 shows voltage and current waveforms for the converter to FIG. 1 when operated in a pulse skipping mode.
Figure 2B:
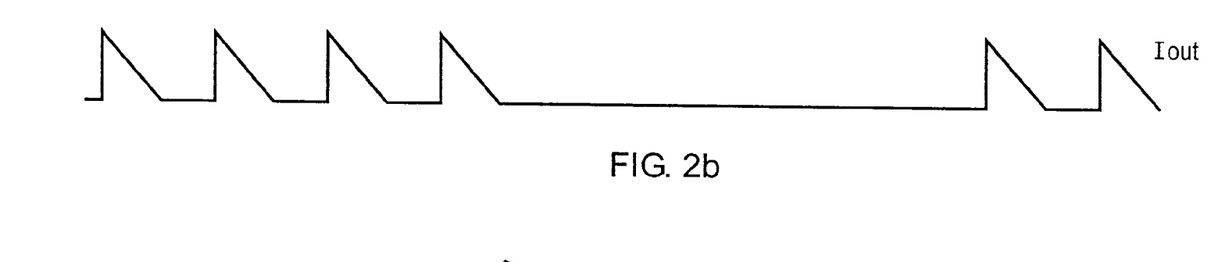

FIG. 2 schematically illustrates a pulse skipping mode of operation for the converter topology of FIG. 1. FIG. 2a shows the coil current, which rises in a first period "1" when the first and second switches 6 and 8 are closed (conducting) and falls in a second period "2" when the first and second switches 6 and 8 are non-conducting, but the third and fourth switches are conducting. Thus, the current in the coil rises and falls cyclically. By contrast, an output current at the output node 30 only has a non-zero value during the time that the magnetic field of the inductor is collapsing. For convenience building the magnetic field up will be referred to as magnetization and collapsing the field to transfer energy to the capacitor 32 will be referred to as demagnetisation.

Figure 2C:
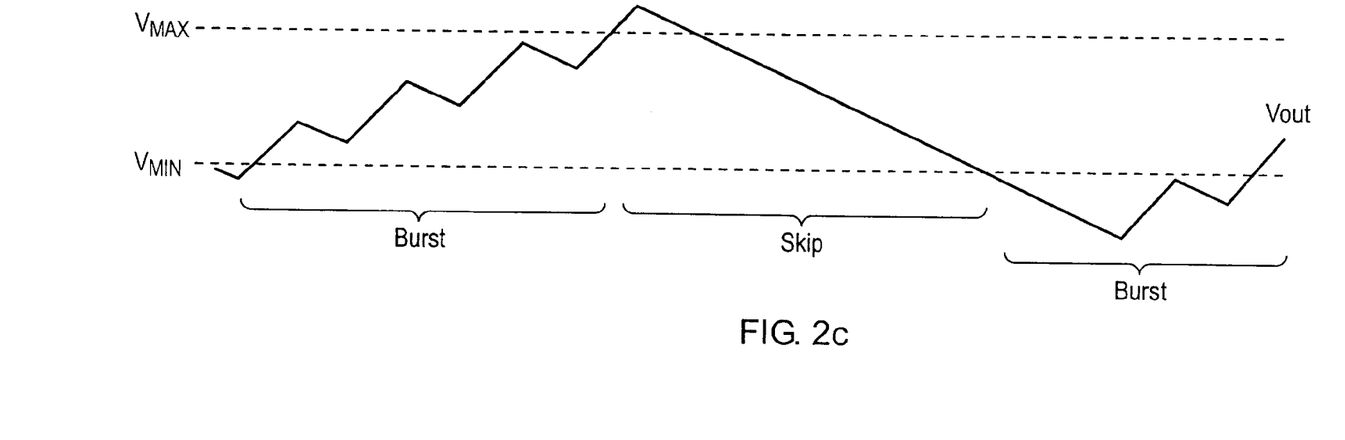

With reference to FIG. 2c, the voltage Vout at the capacitor is monitored, and is allowed to move between an upper voltage threshold $V_{max}$ and a lower voltage threshold $V_{min}$. The converter is arranged that its operation is inhibited once the voltage exceeds $V_{max}$ and is reinstated once the voltage on the capacitor 32 drops below $V_{min}$. This gives rise to periods labelled "Burst" when the converter is operating and other periods labelled "skip" when the converter is disabled and hence there are no switching losses.

In such an arrangement the skip time can last 100 ms or so whereas the burst time could only be tens of microseconds. Under these circumstances switching losses are reduced by around ten thousand times compared to leaving the converter switching all of the time.

In known systems only a small amount of circuitry is left powered in order to detect when the output voltage has reached $V_{min}$ and hence to initiate burst mode. Once burst mode has been activated then the times of the magnetize and demagnetize periods need to be controlled.

During magnetize, the voltage across the inductor is $V_{in}$ so $$\frac{dI}{dt} = \frac{V_{in}}{L}$$

During demagnetize the voltage across the inductor is $-V_{out}$ so $$\frac{dI}{dt} = \frac{-V_{out}}{L}$$

It can be seen that to build the current in the coil from zero to a maximum value, say 0.6 A and then demagnetize the coil back to zero current requires 1) a magnetize time inversely proportional to $V_{in}$.

2) a demagnetize time inversely proportional to $V_{out}$.

It might be supposed that this could simply be done by measuring $V_{in}$ and $V_{out}$. However, even if that could be achieved with sufficient accuracy we could still not know how long it takes to switch the power field effect transistors used to form the switches on and off. The switching times vary with voltage and temperature so cannot be trimmed out.

Figure 3:
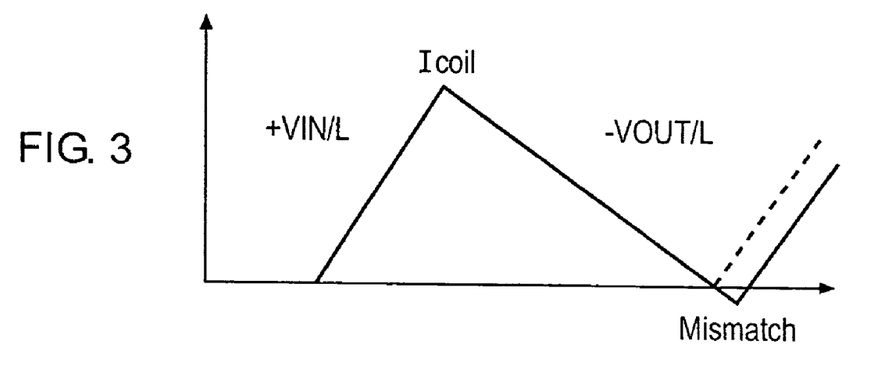
FIG. 3 illustrates in detail how timing errors can give rise to a current error.

This is a significant problem, as will be explained with respect to FIGS. 3 and 4.

Suppose that, either because of difficulty in measuring the input and output voltages or because of switching delays in the transistors forming the first to fourth switches, that the demagnetization time is slightly longer than it should be. This means over a single changing cycle that $I_{coil}$ goes slightly negative. This corresponds to a briefly removing some energy from the output capacitor.

Figure 4A:
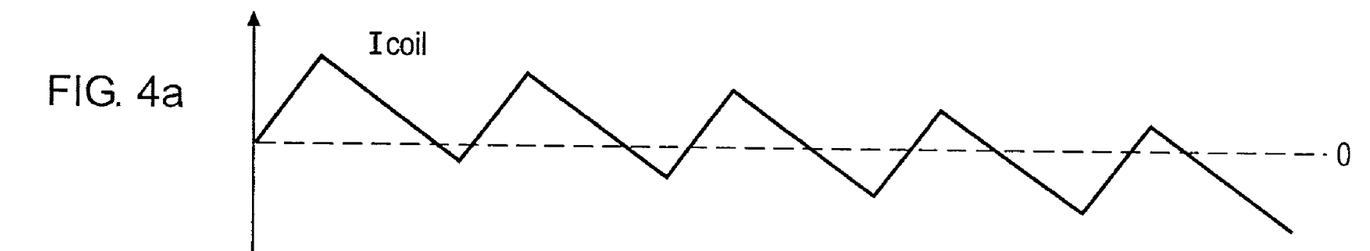
FIGS. 4a and 4b illustrate how a small current error can build to cause the converter to draw current from the storage capacitor at its output.
Figure 4B:
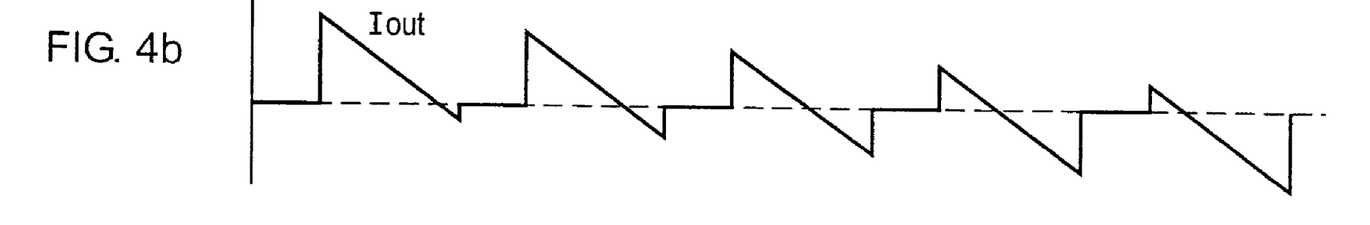

However, as shown in FIGS. 4a and 4b, this small error grows over several burst cycles and $I_{coil}$ starts to drift negatively. This means that $I_{out}$ also starts to change from being predominantly positive (where current is delivered to the output capacitor 32) to being predominantly negative, thereby discharging the output capacitor when we are expecting charge to be delivered to it.

One might suppose that this problem could simply be avoided by adding a comparator to detect when the coil current crosses the zero value threshold and to stop discharge when this event occurs. Whilst this could work, it carries a significant power penalty in order to implement it. To put this in context, suppose that a DC to DC converter is provided in a space constrained device such as a mobile telephone. All of the circuitry for the telephone is powered by the telephone's battery.

In such a device the inductor may be 2 μH and $V_{out}$ is 3 V. Suppose we want an accuracy of 10 mA and that the FET on resistance is 10 mΩ. It follows that the offset at the input stage of the comparator needs to be less than 100 μV. However, the rate of change of coil current is fast, so if we want the comparator to react by the time the discharge current rises by a further 10 mA then the comparator must react around $$6 \text{ ns } \left(\frac{dI}{dt} = 1.5 \times 10^6 \text{ amps per}\right)$$

second in this example). Such a fast and accurate comparator would need a lot of bias current and would need a substantial amount of silicon in order to enable it to be trimmed to achieve this level of accuracy. Thus the solution can easily burn more power than would be lost merely by leaving the DC to DC converter running.

The inventors realised that parasitic components associated with the real transistor switches can be used to measure the direction of current flow in the coil.

Figure 5:
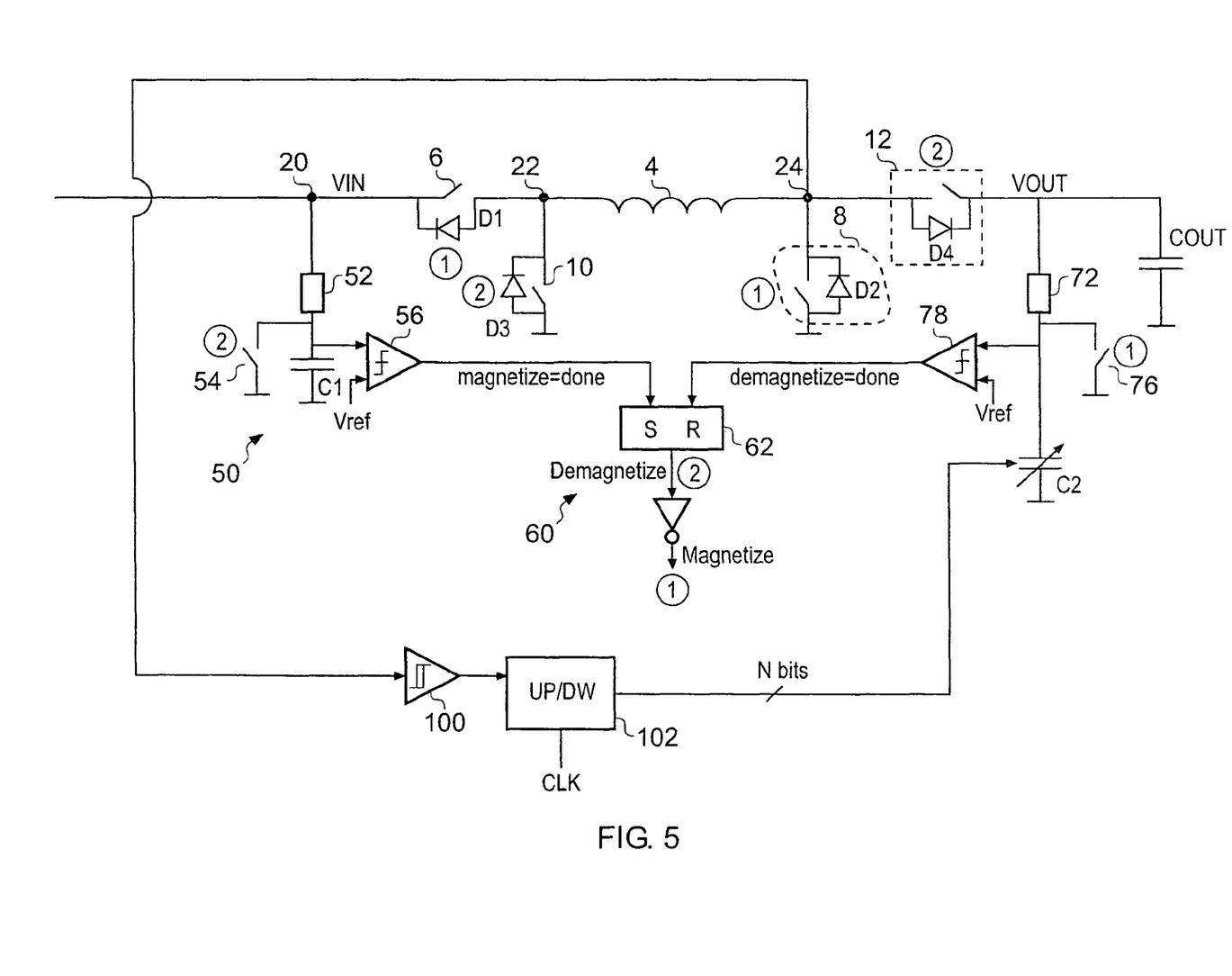
FIG. 5 illustrates a DC to DC converter constituting an embodiment of the present invention.

FIG. 5 shows a DC to DC converter constituting an embodiment of the invention. The first to fourth switches 6, 8, 10 and 12 are implemented as FETs, and the parasitic diodes D1 to D4 associated with the first to fourth switches, 6, 8, 10 and 12, respectively have been shown in the Figure. The circuit also includes a first current monitor 50 for detecting when the magnetising current has reached a threshold value. During the magnetization phase current flows into a capacitor C1 via a series resistor 52 which is connected to input node 20.

A shorting switch 54, implemented as a further FET, is in parallel with the capacitor C1 and is kept in a conducting state until the magnetization sequence is started. As switch 6 closes switch 54 is opened allowing the voltage across the compactor C1 to build. The voltage across C1 is compared with a first reference voltage $V_{ref}$ by a comparator 56. Selection of the relative sizes of C1, resistor 52, and voltage $V_{ref}$ allows the comparator to provide a signal that varies substantially linearly with input voltage $V_{in}$ to indicate when the magnetisation phase is complete. An output of the comparator is provided to a first input of a control circuit 60 which can be as simple as a set-reset flip flop 62.

The demagnetise time is measured in the same way as the demagnetise time should also be inversely proportional to $V_{out}$.

Thus a further series connected resistor 72 and a second capacitor C2 combination are provided. A shorting switch 76 is provided in parallel with the capacitor C2 and acts to short the capacitor C2 out until the demagnetisation phase is started. Once this is commenced the switch is opened a current flowing from the output node via the resistor 72 charges the capacitor C2. The voltage across C2 is compared with a second reference voltage $V_{ref}$ by a second comparator 78 who's output is provided to the control circuit 60. As before with appropriate selection of C2, resistor 72 and $V_{ref}$ the time taken form the voltage on C2 to rise to $V_{ref}$ should be substantially inversely proportional to $V_{out}$.

Thus we have simple circuits for estimating $V_{in}$ and $V_{out}$ and setting the magnetise and demagnetise times appropriately. Resistors 52 and 72 are typically chosen to have values of several hundred kilo ohm.

The circuit also includes a mechanism for determining whether the demagnetization time was too long or too short, and means for adjusting the demagnetisation time, although the magnetisation time could be adjusted instead.

The inventors realised that a short measurement time could be appended to the demagnetisation phase, but prior to the magnetisation phase. During the measurement time the first to fourth switches are all placed into their off (non-conducting) state, such that any current flow in the inductor switches the parallel diodes that are inherently formed with the switches into conduction as appropriate for the direction of current flow. The diodes are parasitic within an integrated circuit, but can be explicitly provided if desired or if the circuit is built using discrete components.

Figure 6:
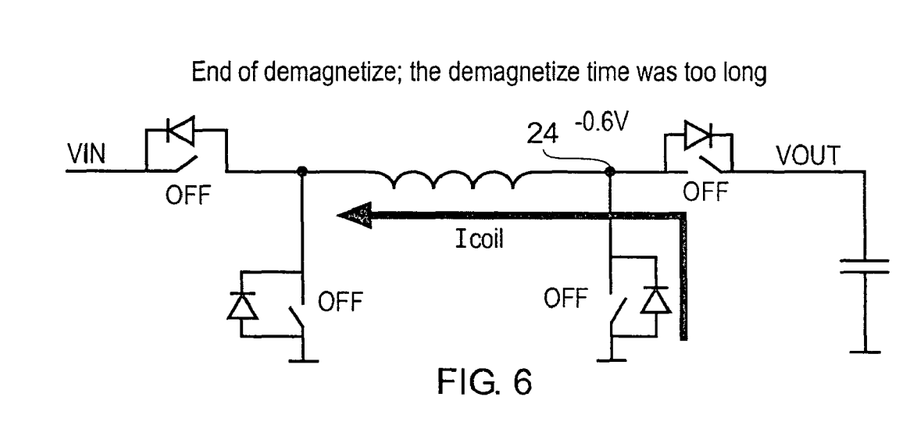
FIG. 6 illustrates the current flow and voltages in the converter if the "demagnetise" time is too long.

If the demagnetize period was too long then the current flow in the coil will be negative. Opening the switches means that the current can only continue to flow by forcing the diodes associated with the first and second switches to conduct. If this occurs then D1 and D2 become conducting, and since the anode of D2 is connected to the common node 26 which represents 0V, then the voltage at node 24 will be one diode voltage drop below ground, which is roughly –0.6 V, as illustrated in FIG. 6.

Figure 7:
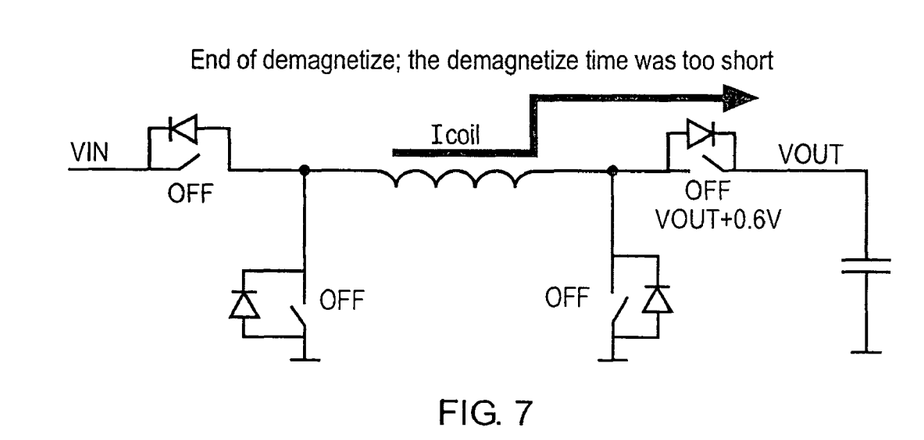
FIG. 7 illustrates the current flow and voltage in the converter if the "demagnetise" time is too short.

However, if demagnetisation was too short then current is still trying to flow to the load when the measurement period begins. This situation is shown in FIG. 7. Current flow can only continue by forcing the diodes associated with the third and fourth switches to conduct, and hence the voltage at node 22 drops to –0.6 V whereas that at node 24 rises to $V_{out}$+0.6 V. If the output voltage is nominally 3 V then the voltage at node 24 is approximately 3.6 V if the demagnetise time was too short.

Detecting a difference between –0.6 V and 3.6 V is easy to do.

Returning to FIG. 5, a Schmitt trigger 100 has its input connected to node 24 and its output is provided to a direction control pin of an up/down converter 102. The counter receives a clock signal at the end of each measurement period such that it responds to the output of the Schmitt trigger by incrementing or decrementing a control word. A latch, such as a set-reset latch may be provided intermediate the Schmitt trigger 100 and the counter 102 and reset or set as appropriate just prior to each measurement phase such that it can be used to capture and remember the decision made by the Schmitt trigger (however fleeting) to indicate that demagnetise was too short.

The capacitor C2 is implemented as a digitally adjustable capacitor. Thus a plurality of capacitors can be switched into or out of connection to the resistor 72 so as to vary the value of C2. The number of capacitors is controlled by the output of the counter 102. Thus if demagnetise was too short, the counter 102 counts up and increases the value of C2, thus increasing the duration of the demagnetise time for the next cycle. If demagnetise is too long, the counter counts down, decreasing the length of the demagnetise for the next cycle.

This feedback loop corrects the value of demagnetise so that it oscillates around its optimum value.

The feedback mechanism can exhibit a long term oscillatory behaviour because the inductor starts each cycle with a current that corresponds to that of the previous cycle and hence acts as an integrator.

If we look at this from a control theory standpoint we have a first pole due to the counter as it takes a while, namely from cycle to cycle, to increment or decrement the counter. In the Z domain its transfer function can be expressed as $$C(Z) = \frac{1}{1 - Z^{-1}}$$

A second pole is provided is provided by the inductor. It's current is $$I_L(t) = \int \frac{V(t)}{L} \cdot dt$$

and this transforms to the Z domain as $$\frac{I_{(L)}(Z)}{V} = \frac{T}{L} \cdot \frac{1}{1 - Z^{-1}}$$

The final transfer function is $$C(Z) = \frac{T}{L} \frac{1}{(1 - Z^{-1})^2}$$

which is unstable, but which can be stabilised by adding a left hand plane zero. If this is also done in the digital domain the transfer function becomes $$C(Z) = \frac{T}{L} \cdot \frac{1 - \alpha Z^{-1}}{(1 - Z^{-1})^2}$$

If $\alpha = 0.5$ we get a good phase margin.
The design is also easy to implement.
If we let $$C(Z) = \frac{D_{out(Z)}}{D_{in(Z)}}$$

where $D_{out(Z)}$ is the digital code used to trim the capacitor and $D_{in(Z)}$ is the value from the Schmitt trigger, i.e. 0 or 1, then for the counter $$\frac{D_{out(Z)}}{D_{in(Z)}} - = \frac{1 - 0.5Z^{-1}}{1 - Z^{-1}}$$

$$= D_{in(n)} - 0.5 D_{in(n-1)}$$

Figure 8:
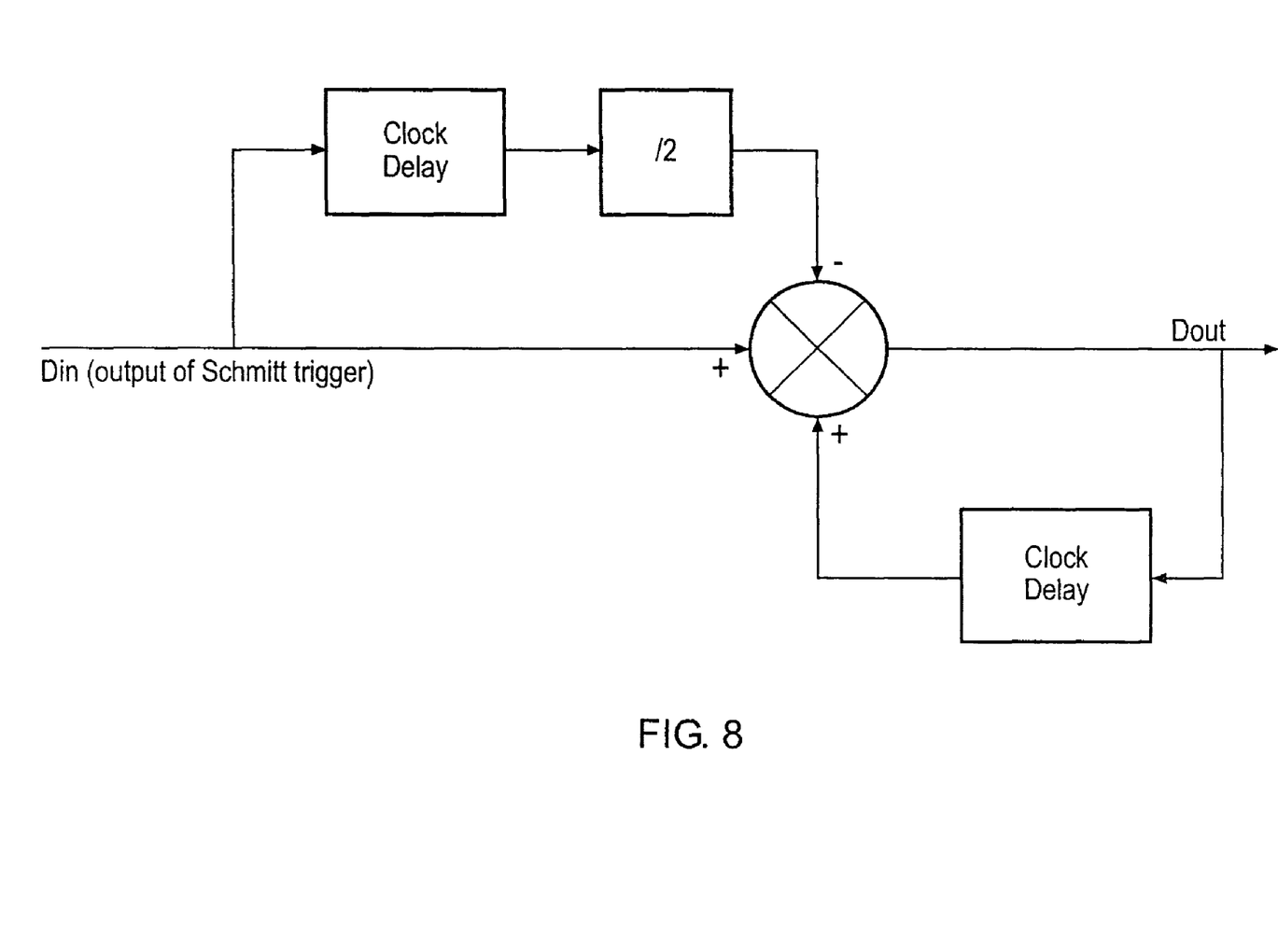
FIG. 8 illustrates a filter that can replace the counter of FIG. 5 to improve stability of the DC to DC converter.

Thus the counter 102 can be replaced by a filter implementing this response. Such a filter is illustrated in FIG. 8 and only requires two flip flops to provide the two clock delay elements, a divide by two (which can be done as a shift) and an adder.

It is thus possible to provide a DC to DC converter having a control system that works reliably for low output currents.

The invention claimed is:

1. A DC to DC converter comprising:
   an inductor;
   a plurality of switches for controlling current flow in the inductor in cycles, each cycle including at least a first phase of operation and a second phase of operation, such that the inductor is connected to a supply in the first phase of operation such that the inductor receives energy from the supply, and such that the inductor is connected to an output in the second phase of operation in order to deliver energy to the output; and
   a controller arranged to monitor the current flow in the inductor at the end of the second phase of operation and to modify the relative duration of subsequent second phases compared to the first phase as a function of the current flow.

2. A DC to DC converter as claimed in claim 1, in which a measurement phase occurs at the end of the second phase, where the switches are non-conducting and the polarity of the voltage across the inductor is indicative of whether the second phase was too long or too short.

3. A DC to DC converter as claimed in claim 1, in which the duration of the first phase is controlled such that a current in the inductor rises to a first value.

4. A DC to DC converter as claimed in claim 1, in which the duration of the second phase is controlled such that a current in the inductor attains a second value.

5. A DC to DC converter as claimed in claim 1, in which the switches have respective parallel current flow paths.

6. A DC to DC converter as claimed in claim 5, in which the current flow paths are provided by diodes.

7. A DC to DC converter as claimed in claim 6, in which the switches are transistors.

8. A DC to DC converter as claimed in claim 1, in which the duration of the first phase is substantially inversely proportional to the voltage at the supply.

9. A DC to DC converter as claimed in claim 8, in which the duration of the first phase is determined by the time taken to change a first capacitor to a first reference voltage, where the first capacitor is in series connection with the supply via a first resistor.

10. A DC to DC converter as claimed in claim 1, in which the duration of the second phase is substantially inversely proportional to a voltage at the output of the converter.

11. A DC to DC converter as claimed in claim 10, in which the duration of the second phase is determined by the time taken to charge a second capacitor to a second reference voltage, where the second capacitor is in series connection with the output via a second resistor.

12. A DC to DC converter as claimed in claim 11, in which the controller is adapted to vary the value of at least one of the second resistor, the second capacitor and the second reference voltage.

13. A DC to DC converter as claimed in claim 1, in which first to fourth switches are provided, each with a reverse biased diode in parallel therewith, wherein the first switch is connected between an input and a first node, the inductor is connected between the first node and a second node, the second switch is connected between the second node and a common node, the third switch is connected between the common node and the first node and the fourth switch is connected between the second node and the output node.

14. A DC to DC converter as claimed in claim 2, in which a voltage at a connection to the inductor is measured in order to determine the direction of current flow in the inductor.

15. A DC to DC converter as claimed in claim 1, in which the converter is operable in a pulse skipping mode.

16. A DC to DC converter, comprising:
first, second, third and fourth electrically controlled switches, each in parallel with a unidirectional current flow device;
an inductor;
an input;
an output; and
a controller, the first switch extending between the input and a first node, the inductor extending between the first node and a second node, the second switch extends between the second node and a common node, the third switch extends between the common node and the first node, and the fourth switch extends between the second node and the output, and a charge store extends between the output, and a common node, wherein the controller is adapted to control the switches in a first mode of operation so as to build the current in the inductor and then to reduce the current, thereby delivering charge to the charge store, and wherein the controller monitors the current flow after a reducing period, and varies one of the time for which the current is built in the inductor and the time for which the current is reduced so as to set the current flow to a target value.

17. A DC to DC converter as claimed in claim 16, in which the target value in the first mode is zero.

18. A DC to DC converter as claimed in claim 16, in which the controller is arranged to place the switches in a high impedance state prior to monitoring the current flow.

19. A DC to DC converter as claimed in claim 16, in which the duration for which the inductor is energised is inversely proportional to the voltage at the input.

20. A DC to DC converter as claimed in claim 19, in which time for which the inductor is energised varies inversely with the value of inductance of the inductor such that, at the end of the energisation period the current is at a peak threshold value.

21. A DC to DC converter as claimed in claim 16, in which the first mode is used to charge the current store when the current drawn from the current store is less than a low load current threshold.

22. A DC to DC converter as claimed in claim 21, wherein the converter is further operable in a second mode in which the electrically controlled switches are placed in a high impedance state.

23. A DC to DC converter as claimed in claim 22, in which the second mode is entered once the voltage at the output of the converter exceeds a high voltage threshold.

24. A DC to DC converter as claimed in claim 22, in which the second mode is exited when the voltage at the output of the converter drops below a low voltage threshold.

25. A method of operating a DC to DC converter where the converter comprises an inductor and a plurality of switches for controlling current flow in the inductor such that the inductor is cyclically magnetised and demagnetised, the method comprising the steps of estimating the direction of current flow at the end of the demagnetisation step, and adjusting the duration of the next demagnetisation step based on the direction current flow.

26. A DC to DC converter comprising:
an inductor;
a plurality of switches for cyclically controlling current flow in the inductor, such that the inductor is connected to a supply in a first phase of a cycle such that the inductor receives energy from the supply, and such that the inductor is connected to an output in a second phase of the cycle in order to deliver energy to the output;
a first unidirectional current flow device connected in parallel with a first switch and oriented to conduct during inductor current flow of an obverse direction;
a second unidirectional current flow device connected in parallel with a second switch and oriented to conduct during inductor current flow of a reverse direction;
a controller connected to the first and the second unidirectional current flow devices, such that the controller is adjusted according to the current flow in the inductor at the end of the second phase of the cycle, wherein the controller is arranged to modify the relative duration of subsequent second phases compared to the first phase as a function of the current flow.

27. The DC to DC converter of claim 26, wherein the controller includes a bidirectional counter configured to count in a first direction when the current flow in the inductor is in the obverse direction, and to count in a second direction when the current flow in the inductor is in the reverse direction.

28. The DC to DC converter of claim 27, wherein the counter is connected to a variable element that is adjusted based on a current state of the counter, wherein the relative duration of any second phase is determined in part by the variable element.

29. The DC to DC converter of claim 27, wherein the counter is adjusted during a measurement phase following the second phase, wherein the measurement phase includes opening the plurality of switches.

30. A DC to DC converter comprising:
an inductor;
a plurality of switches for controlling current flow in the inductor such that the inductor is connected to a supply in a first phase of operation such that the inductor receives energy from the supply, and such that the inductor is connected to an output in a second phase of operation in order to deliver energy to the output; and
a controller arranged to monitor the current flow in the inductor at the end of the second phase of operation and to modify the relative duration of subsequent second phase compared to the first phase as a function of the current flow;
wherein the duration of the first phase is determined by the time taken to change a first capacitor to a first reference voltage, and wherein the first capacitor is in series connection with the supply via a first resistor.

31. The DC to DC converter as claimed in claim 30, in which the duration of the second phase is determined by the time taken to charge a second capacitor to a second reference voltage, where the second capacitor is in series connection with the output via a second resistor.

32. The DC to DC converter as claimed in claim 31, in which the controller is adapted to vary the value of at least one of the second resistor, the second capacitor and the second reference voltage.

* * * * *